United States Patent

DePaul

[11] Patent Number: 5,242,034
[45] Date of Patent: Sep. 7, 1993

[54] OIL RECLAMATION DEVICE
[75] Inventor: Michael DePaul, Inverness, Ill.
[73] Assignee: Southeast Capital Financing Inc., Clearwater, Fla.
[21] Appl. No.: 778,281
[22] Filed: Oct. 17, 1991
[51] Int. Cl.$^5$ .............................. F01M 5/00
[52] U.S. Cl. .................. 184/6.22; 184/6.24; 196/46.1; 210/180
[58] Field of Search ............... 184/6.22, 6.24, 104.1; 210/186, 180, 184; 196/46.1, 115, 121, 128

[56] References Cited

U.S. PATENT DOCUMENTS

| | | | |
|---|---|---|---|
| 1,718,800 | 6/1929 | Rea . | |
| 2,460,888 | 2/1949 | Koinzan | 210/186 |
| 2,839,196 | 6/1958 | Schwalge | 210/180 |
| 3,616,885 | 11/1971 | Priest | 196/128 |
| 3,756,412 | 9/1973 | Barrow | 210/180 |
| 3,912,631 | 10/1975 | Turman | 210/136 |
| 4,093,548 | 6/1978 | Sterkenburg et al. | 210/180 |
| 4,115,201 | 9/1978 | Malec | 196/46.1 |
| 4,146,475 | 3/1979 | Forsland | 210/71 |
| 4,189,351 | 2/1980 | Engel | 196/115 |
| 4,227,969 | 10/1980 | Engel | 196/115 |
| 4,289,583 | 9/1981 | Engel | 210/180 |
| 4,349,438 | 9/1982 | Sims | 210/180 |
| 4,354,946 | 10/1982 | Warlick et al. | 210/774 |
| 4,369,110 | 1/1983 | Picek | 210/180 |
| 4,388,185 | 6/1983 | Ott et al. | 210/136 |
| 4,585,924 | 4/1986 | Pakula | 219/205 |
| 4,943,352 | 7/1990 | Lefebvre et al. | 210/180 |

FOREIGN PATENT DOCUMENTS 0575123  5/1959  Canada .............. 210/180

OTHER PUBLICATIONS

U.S. Department of Energy; "Initial Assessment of Selected Advanced Lubricating Oil Filters"; pp. 1-28; Sep., 1981; Anaheim, Calif.

Primary Examiner—Ira S. Lazarus
Assistant Examiner—Alan B. Cariaso
Attorney, Agent, or Firm—Spencer, Frank & Schneider

[57] ABSTRACT

An oil reclamation device comprising an evaporator plate with a cap secured thereto form an evaporation chamber which is heated by a heating element mounted in the evaporator plate and secured to the cap and evaporator plate by screws. A spin on filter housing removably is mounted to the evaporator plate by threadably mounting it to the evaporator plate and a filter cartridge is spring mounted in the filter housing against a secondary filter pad. The evaporator plate is provided with an oil inlet to receive oil to be reclaimed and an oil outlet to discharge reconditioned oil which has passed through the filter cartridge and the evaporator plate into the heated evaporation chamber.

15 Claims, 9 Drawing Sheets

OIL RECLAMATION DEVICE

FIELD OF THE INVENTION

This disclosure generally relates to an oil filter and reconditioning device used on internal combustion engines and to an improved device with a detachable filter housing and cartridge assembly which allows the filter cartridge to be easily changed. The reconditioning device can be disassembled and reassembled for easy installation and maintenance.

BACKGROUND OF THE INVENTION

This invention relates to fluid reclamation devices which are used with engines using lubricating oils and hydraulic systems to remove solid contaminates and water or other volatile contaminates from the lubricating oils or hydraulic fluids. More particularly, the invention relates to a unique evaporation plate construction and an improved screw on filter assembly.

Oil reclamation devices of the general type disclosed and described herein are generally well known. These devices are used to remove both solid and liquid contaminates from the lubricating oil. It is well known that oil in and of itself does not "wear out" and that additives contained in the oil remain relatively stable once a predetermined level has been reached. Once the solid and volatile contaminates are removed from the oil, the oil is substantially reconditioned and remains in a useful state.

A discussion of oil reclamation devices is found in U.S. Department of Energy publication DOE/BC/10256-1 Initial Assessment of Selected Advanced Lubricating Oil Filter, September 1981. As part of the publication, patent and literature searches were conducted. Fifty seven patents were listed which showed filters that extract vapor from oil under vacuum and/or with added heat along with seventeen literature references.

Pertinent prior art which is specifically directed towards oil reclamation devices of the general construction of the present invention are typified by the U.S. Pat. Nos. 4,289,583, 4,227,969, 4,189,351 and 4,943,352.

U.S. Pat. No. 4,289,583 discloses an oil reclamation device with a cap heating head having a heat transmitting member mounted in a cavity and an evaporator plate mounted to the cap heating head to form a baffled evaporator chamber. The filter housing contains the evaporator plate and is secured to the cap heating head. The filter housing is provided with an oil inlet valve at its bottom.

U.S. Pat. Nos. 4,227,969 and 4,189,351 disclose oil reclamation devices of a similar construction, both having a fixed filter and oil inlet positioned in the base of the filter which requires piping from the engine or fluid source to disburse oil upward into the filter.

It is known in the art to utilize removable filters in connection with heated oil refining apparatus to remove liquid and solid contaminates from the oil used in internal combustion engines.

As an example in U.S. Pat. No. 4,146,475 the fine filter and coarse filter which are used in the apparatus can be replaced by separating them from the concentric cylinder housing by unscrewing the concentric cylinder housing.

In U.S. Pat. No. 4,585,924 a spin on diesel oil filter is used. The filter is constructed of conventional pleated paper construction with a base plate having a central threaded bore. The filter is screwed onto the lower threaded end of a nipple on an associated spacer which is in turn threaded at its top and screwed onto a second externally threaded nipple that is cast in and extends from the manifold.

In U.S. Pat. No. 4,943,352 a screwed on filter cartridge is fastened onto a nipple of an evaporator head with the cap member holding a heating element which is used to heat the evaporation chamber. A throughgoing tube is secured in the filter cartridge to deposit oil at the bottom of the filter.

In U.S. Pat. No. 4,369,110 the filter cartridge is provided with a perforated web having a central internal threaded opening which is screwed onto the outside of the end of a coaxial pipe which serves as an oil inlet and conduit. A needle member is screwed to the inside of the coaxial pipe and is jammed into the filter media providing a passageway for the oil into the filter cartridge.

The following patents also disclose the general state of the filter refining art: U.S. Pat. Nos. 4,388,185; 4,354,946; 4,249,438; 4,272,371; 4,261,838; 3,912,631 and 2,707,051.

Numerous disadvantages are associated with these known devices. For example, oil flows directly at a fairly high flow rate into a specific area of filter without dispersal throughout the filter container causing filter clogging and an increase in the micro size of the particles that are able to be filtered. Oil containing unvolitized contaminates will pass from the filter directly out of the oil outlet means of the container because it will not be included in any thin film traveling over the vaporizing surface on the upper side of the evaporator plate.

It is important that the oil passing across the vaporizing surface be maintained in a thin film to promote vaporization of the liquid contaminates. With other known filter refining devices, if the longitudinal axis is angularly disposed from the vertical while installed, the oil will all flow to one side of the evaporator plate.

None of the prior art devices are designed to effect the greatest efficiency of removing the contaminates and maintaining the operation of the device. Pressure build-up causes oil flow problems and shifting of the filter medium during operation. Inefficient transfer of heat from the heating surface to the thin film of oil is encountered because of spacing problems in the heater cavity and lack of heat conduction.

Another object of the invention is to provide a removable filter cartridge in an oil reclamation device which results in a high filtered oil flow.

A further object of the invention is to provide an evaporator plate with a heat transmitting member which contributes to establish a uniformity in heating and fluid flow through the evaporation chamber.

It is a further object of this invention to provide a filter assembly which will obviate problems associated with the disposition of fibrous material in the filter as it is provided in prior art oil reclamation devices.

SUMMARY OF THE INVENTION

The present inventive oil reclamation device comprises an evaporator plate which holds a heating member and together with its associated cap defines an evaporation chamber. The evaporator plate defines an upper surface forming a vaporizing surface along which oil passes in a thin film and has a lower planar surface which abuts the filter housing and is provided with a threaded male aperture member which holds the filter housing. Oil passes from the filter through the evaporator plate onto the upper outwarding extending surface of the center member of the evaporator plate to deliver oil into the evaporation chamber in a thin film along the vaporizing surface.

The heating element of the present invention is designed to fit into the cavity formed in the evaporator plate and is held in a secured position therein for surface to surface engagement for optimum heat conductivity.

The invention also utilizes effective sealing between the evaporator plate and the filter housing to control the flow of substantially all of the oil through the center of the evaporator plate and the filter housing.

A tubular member is centrally positioned in a filter cartridge mounted in the filter housing to cause the oil to pass from the inlet means through radially disposed holes along the length of the tubular member into the filtration medium. The oil then flows through the filtration medium up the outer side of the cartridge into a secondary filter pad and out of the openings located in the upper end portion of the filter housing into the evaporator plate passageways and into the evaporation chamber.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

DESCRIPTION OF SPECIFIC EMBODIMENTS

The preferred embodiment and best mode of the invention is shown by FIGS. 1-14.

Figure 1:
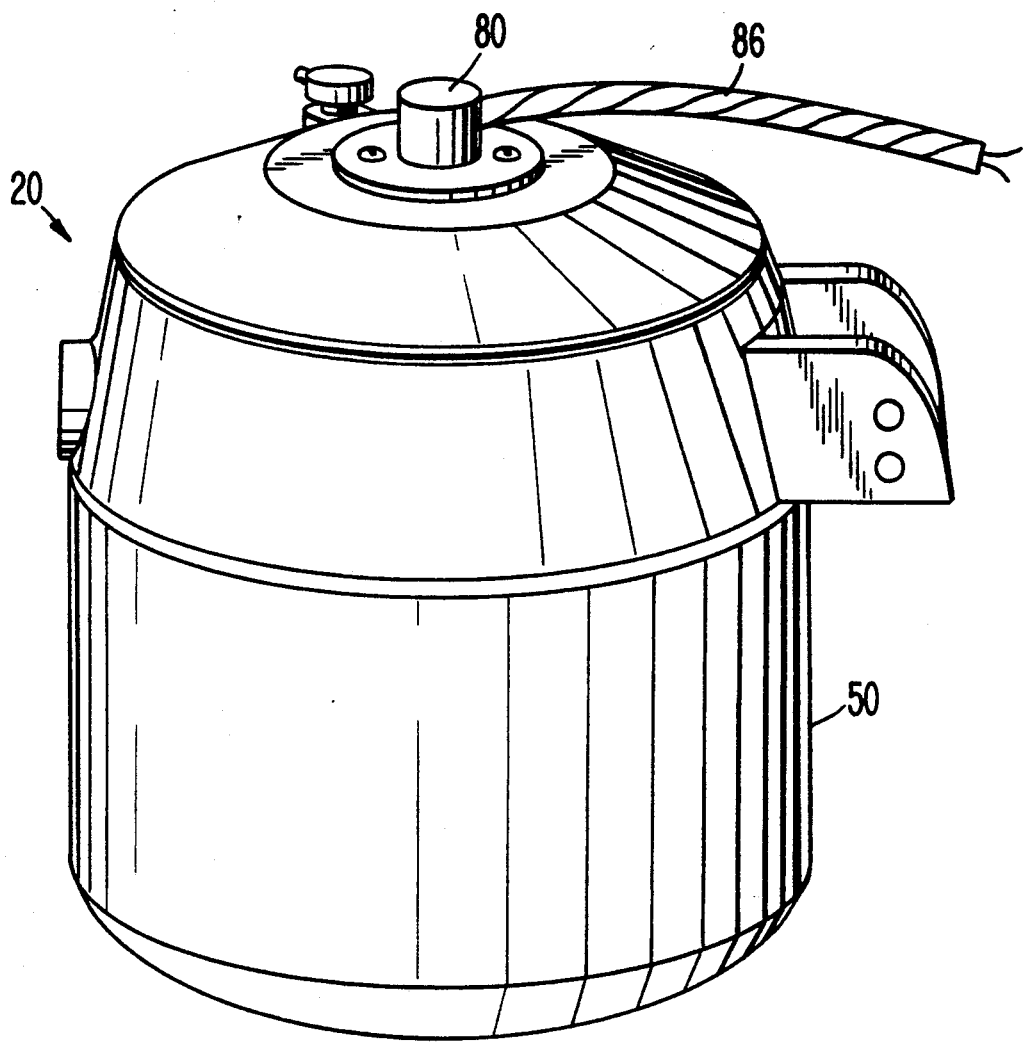
FIG. 1 is a perspective view of the inventive oil reclamation device.
Figure 2:
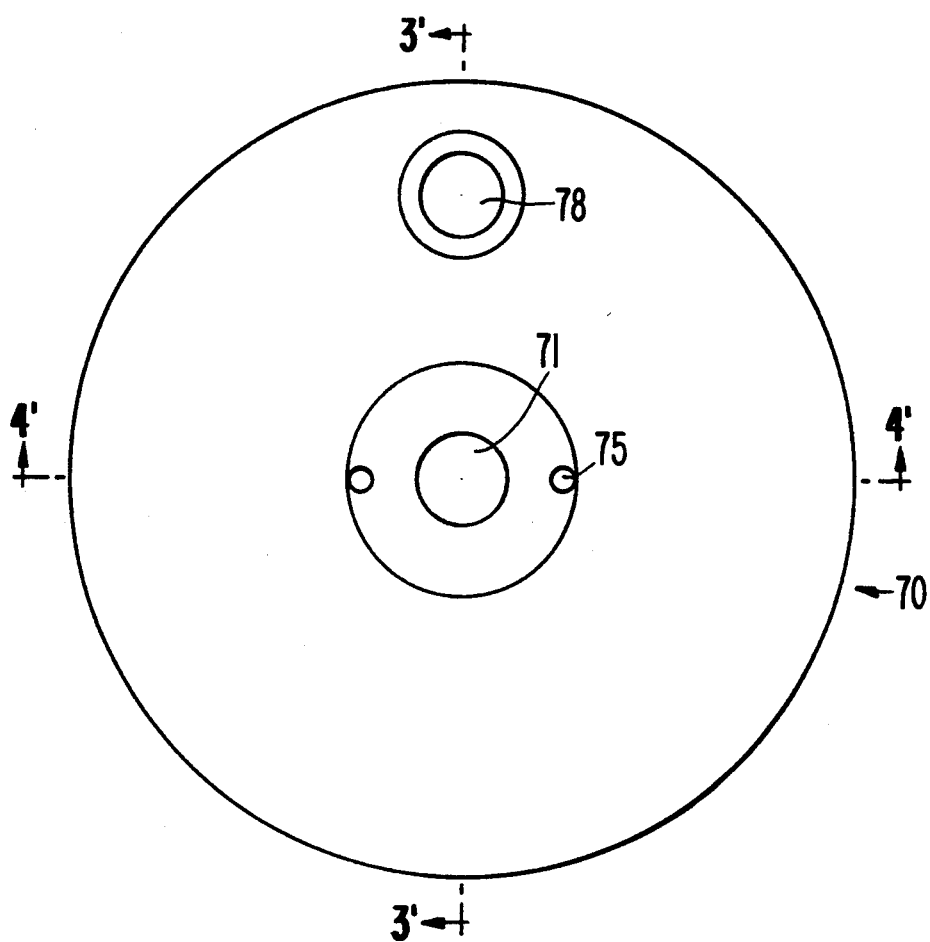
FIG. 2 is a top plan view of the cap of the oil reclamation device of FIG. 1.
Figure 14:
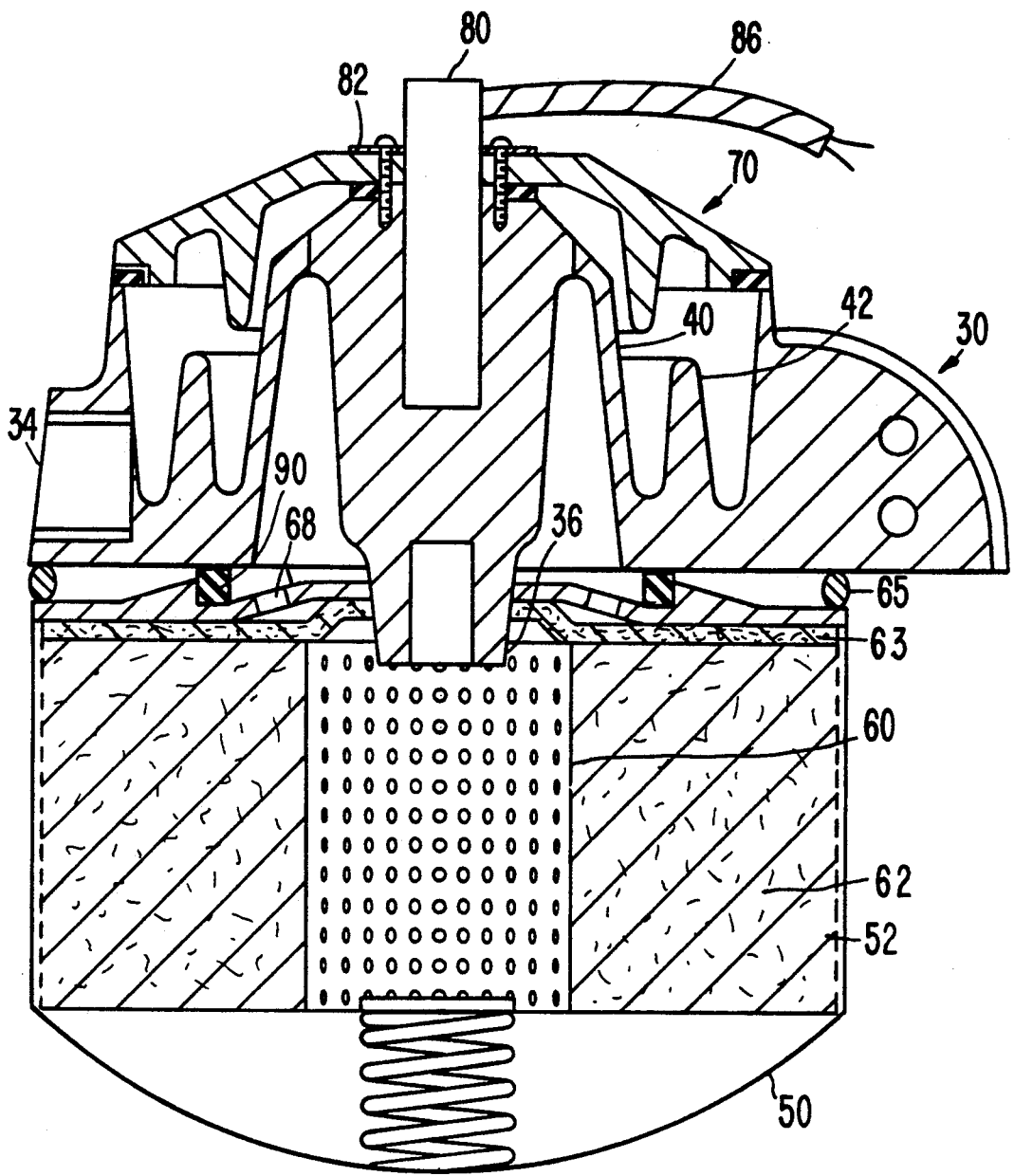
FIG. 14 is a full cross sectional view of the inventive oil reclamation device as shown in FIG. 1.

The reclamation device, generally designated 20, and most clearly shown in FIGS. 1 and 14 has a evaporator plate 30 provided with an oil inlet channel 32 and an oil outlet channel 34. The evaporator plate 30 has a lower planar surface 33 with an integrally formed lower projecting male member 36. The male member 36 projects outward from the planar surface and is threaded at 37 on its exterior to engage a threaded tapered hole 68 of the attachment face plate 51 of filter housing 50. The housing 50 is threadably mounted on male member 36 via face plate 51 with an oil flow tube 60 axially aligned with bore 38 of the threaded male member 36 to direct fluid into the perforated one inch diameter flow tube 60. All of the oil received is introduced directly into the filter housing via the flow tube 60.

Figure 12:
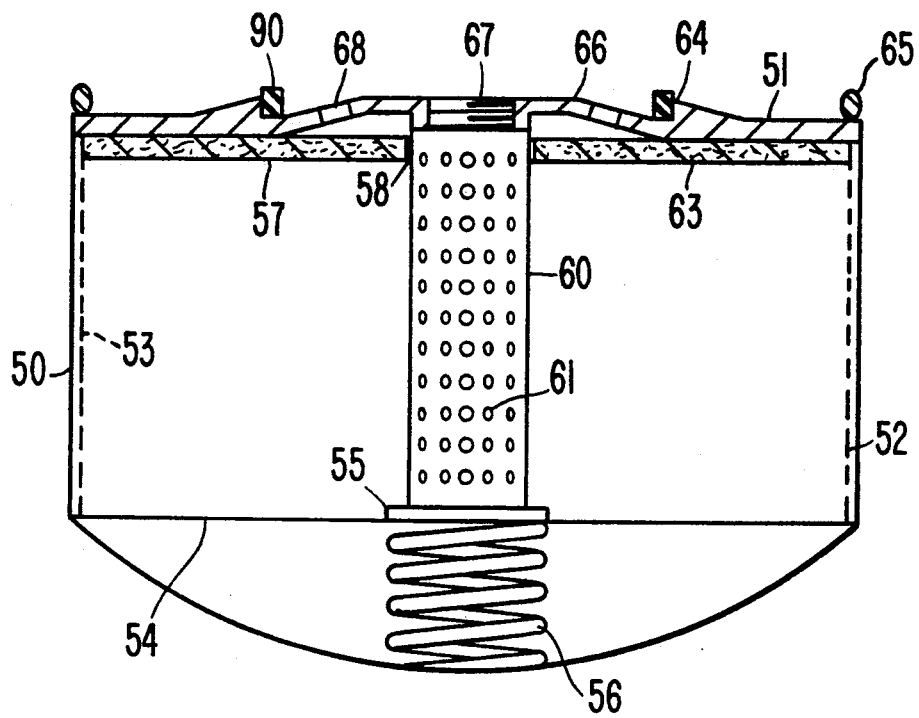
FIG. 12 is a cross sectional view of the filter assembly.
Figure 13:
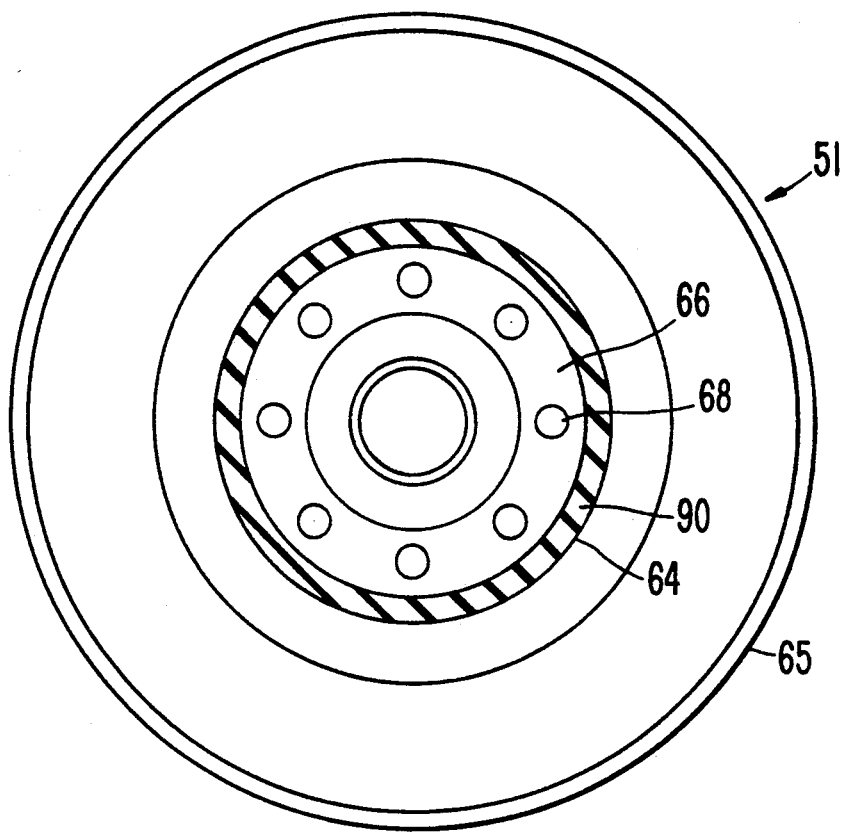
FIG. 13 is a top plan view of the filter shown in FIG. 12.

A spin on filter housing 50 is mounted on the projecting male member 36 and defines a mechanical filtration zone which receives all of the oil coming into the reclamation device 20. The filter assembly includes the housing 50 with face plate 51 and a cartridge 52 mounted therein. The cartridge 52 is constructed with a cylindrical perforated side 53, a solid bottom plate 54 which defines an annular recessed seat 55 to hold biasing spring 56 and a solid top plate or lid 57 with an aperture 58 which receives and holds flow tube 60. A compressed fibrous filter material 62 is contained in the cartridge. A ⅛ inch 40 micron felt pad 63 is positioned on top of the lid 57 adjacent the face plate 51 to form a secondary filter stage which keeps cotton strands or fibers from being carried into the engine. The cartridge 52 is mounted in housing 50 and is spring biased by spring 56 as shown in FIG. 12. The face plate 51 defines an annular shoulder 64 to hold gasket 90, an outer peripheral rib 65 which abuts against planar surface 33 and a domed surface 66 which defines a threaded tapered female bore 67 which receives male number 36 on its inner surface and holds the perforated tube 60 on the outer surface. A plurality of oil discharge holes 68 ring the domed area 66.

Evaporator plate 30 is disposed adjacent the mechanical filtration zone defined by the filter housing 50. Plate 30 which is constructed of a special aluminum alloy includes a plurality of integrally formed upwardly projecting sectioned evaporation walls 42 which define a plurality of curved vaporizing surfaces laterally displaced radially with respect to each other. An outwardly directed vaporizing surface 44 on the central vaporizing surface member 40 faces downwardly toward the evaporation walls 42 and filtered fluid is directed from the outwardly and downwardly inclined projecting top surface 41 of central member 40 onto the downwardly projecting surface 44.

The fluid traveling or vaporizing surfaces which are defined between the central member 40, sectioned walls 42a and 42b and end wall 43 are annular. The sectioned walls 42 form a baffle configuration within the evaporator chamber 100. Thus, a meandering path for the oil from the center member 40 of the evaporator plate to the oil outlet 34 is attained.

The center member 40 defines a heater chamber 45 and is also provided with a plurality of throughgoing bores or passageways 47 allowing oil to flow from the filter (via holes 68) through the evaporator plate 30 into the evaporation chamber 100 adjacent heater member 80. The initial fluid traveling surface after the fluid has been preheated traveling through passageway 47 is defined along an incline extending downwardly from the central member 40 along surfaces 41 and 44 away from the heater member 80. The top of the Center member 40 defines a heater rim 48 and a planar annular surface 49 to seat gasket member 79. The heater member 80 shown in FIGS. 10 and 11 has a flange 82 provided with two bores 84 which are coaxially aligned with bores 46 in the center member 40 allowing the same to be fastened by screws or other fasteners to the center member 40.

The oil passageways 47 extend through plate 30 and deliver substantially all of the exiting oil from holes 68 of the filter zone to the top of the center member 40 so that the oil can cascade down the outwardly inclined upper surface 41 and down the side surface 44 of the center member. The passageways 37 take the form of a conical staged bore and extend from adjacent the mechanical filtration zone where they have their widest cross-section and open into the evaporation chamber 100 along the oil introducing surface 41 where the passageways have their narrowest cross-section. The oil introducing surface 41 is inclined downwardly and outwardly with respect to the center axis of plate 30 to direct all of the oil in a thin film downwardly over the vaporizing surface away from the heater element 80.

The sectioned wall 42 comprises two sections 42a and 42b divided by a fluid flow path 142 which together with center member 40 form an evaporation surface. This configuration is most clearly shown by FIG. 6 of the drawings.

Figure 3:
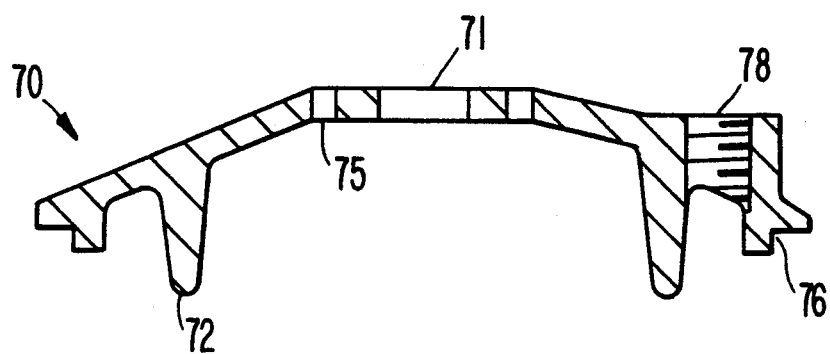
FIG. 3 is a cross sectional view of the cap of FIG. 2 taken across section 3'—3'.
Figure 4:
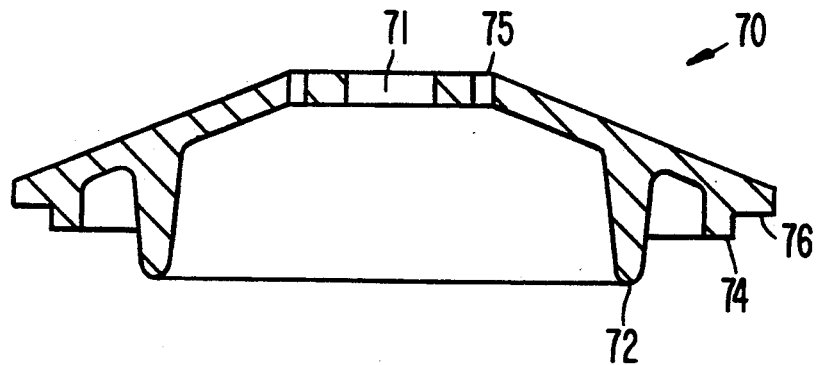
FIG. 4 is a cross sectional view of the cap shown in FIG. 2 taken across line 4'—4'.
Figure 5:
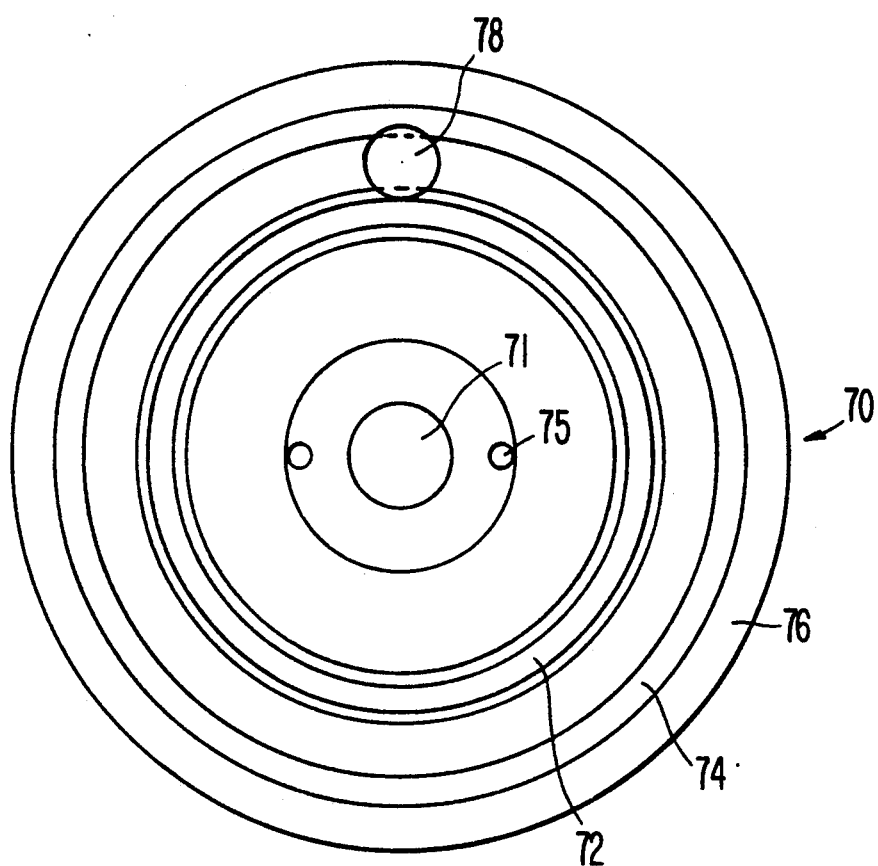
FIG. 5 is a plan view of the bottom of the cap shown in FIG. 2.
Figure 10:
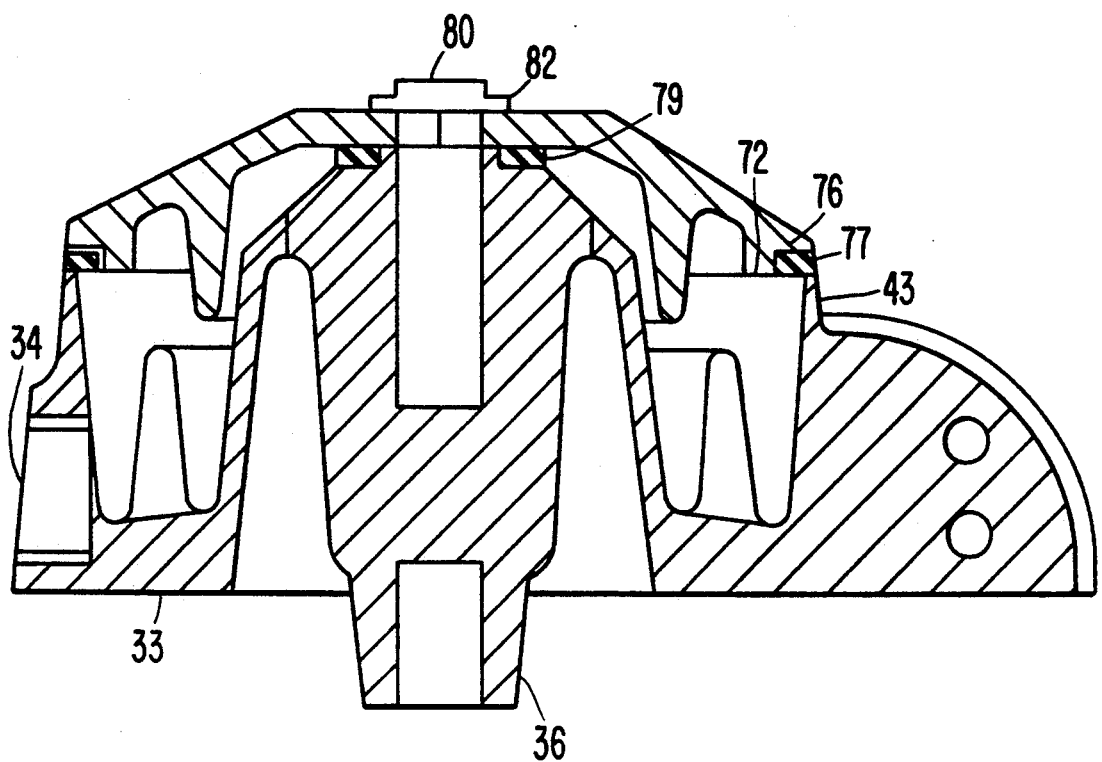
FIG. 10 is a cross sectional view taken across the assembled cap and evaporator plate.
Figure 11:
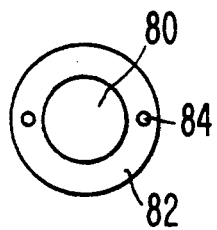
FIG. 11 is a top plan view of the heater and flange.

A cap member 70 as shown in FIGS. 2-5 is constructed of a special aluminum alloy is used to cover the plate evaporation surface and forms evaporation chamber 100 with evaporation plate 30. The cap has downwardly projecting tapered heating wall member 72 and a sealing wall 74. Wall member 72 is located between the central member 40 and the sectioned evaporator plate walls 42a and 42b when the cap member 70 is secured to the evaporation plate 30. The sealing wall 74 with an associated shoulder 76 holds a gasket 77 which is located adjacent and on top of evaporator plate wall 43 as shown in FIG. 10. The cap member 70 is mounted to the outer surface of the evaporator plate through screws mounted in heater flange 82 through bores 75 in the cap and aligned bores 46 of center member 40 to maintain the heating element in a secured position and secure the cap member 70 to the evaporator plate 30. A internal sealing gasket 79 is mounted around rib 48 of central member 40 and is seated on flat annular surface 49 of the central member 40. The cap member 70 is provided with an aperture 71 which allows the heating element 80 to project therethrough as is shown in FIG. 10. A vent bore 78 as shown in FIG. 3 is cut in the cap wall to allow vapors to escape from the evaporation chamber 100 during the operation of the reclamation device 20.

The cap wall member 72 and sealing wall 74 along with the evaporator plate walls 42 define a curved path to guide the oil from the center member 40 of outwardly to the oil outlet 34.

The heating element 80 is ½ inch diameter and 2 inches overall length and is constructed of stainless steel for longevity and safety and is connected directly to a power source (not shown) by the electrical leads 86. The heater generates 50 watts from a 12 or 24 volt battery. The heating element 80 and heater cavity 45 are both constructed to get as snug a fit as possible to provide surface to surface contact between the heating element 80 and inside wall of the cavity 45 for conducting heat through the center member 40 to maintain a suitable temperature in the evaporation chamber 100 to accelerate vaporization of fuel and water from the oil.

Figure 6:
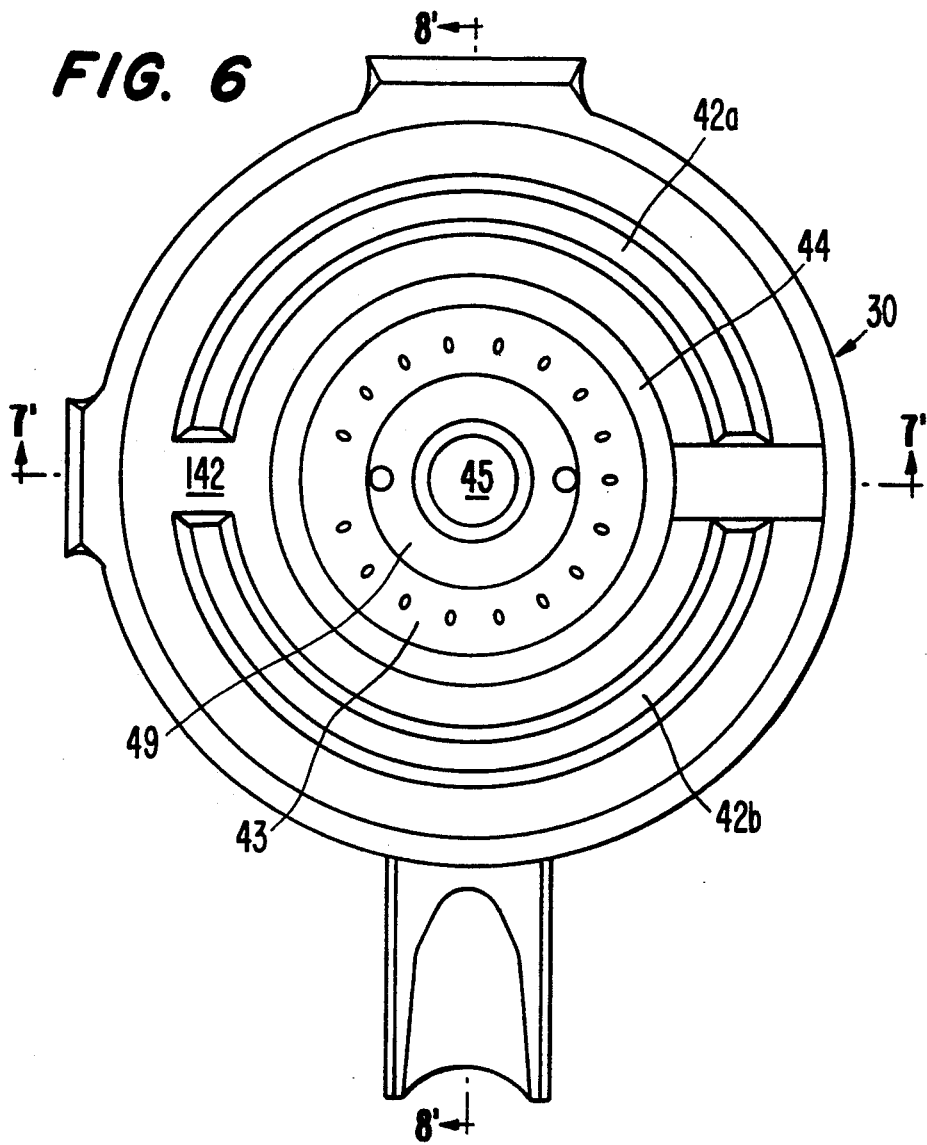
FIG. 6 is a top plan view of the top of the evaporator plate of the oil reclamation device shown in FIG. 1.
Figure 7:
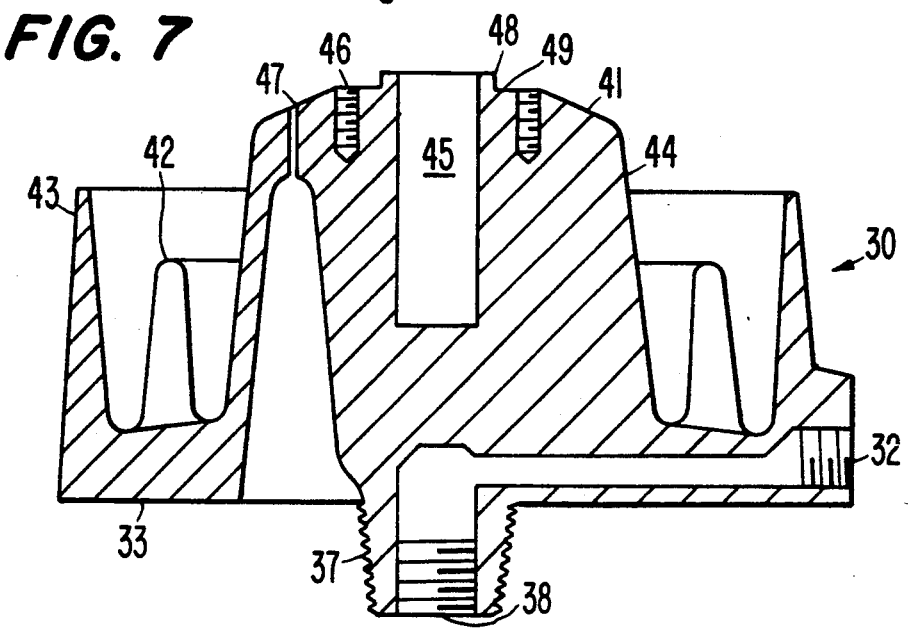
FIG. 7 is a cross sectional view of the evaporator plate of FIG. 6 taken across line 7'—7'.
Figure 8:
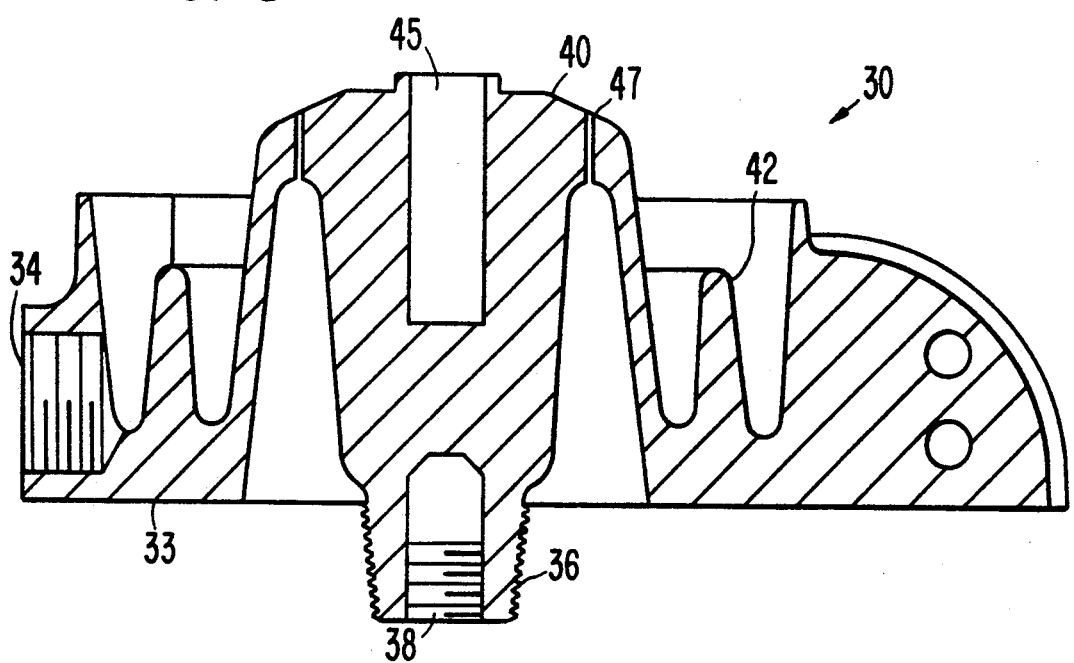
FIG. 8 is a cross sectional view of the evaporator plate of FIG. 6 taken across line 8'—8'.
Figure 9:
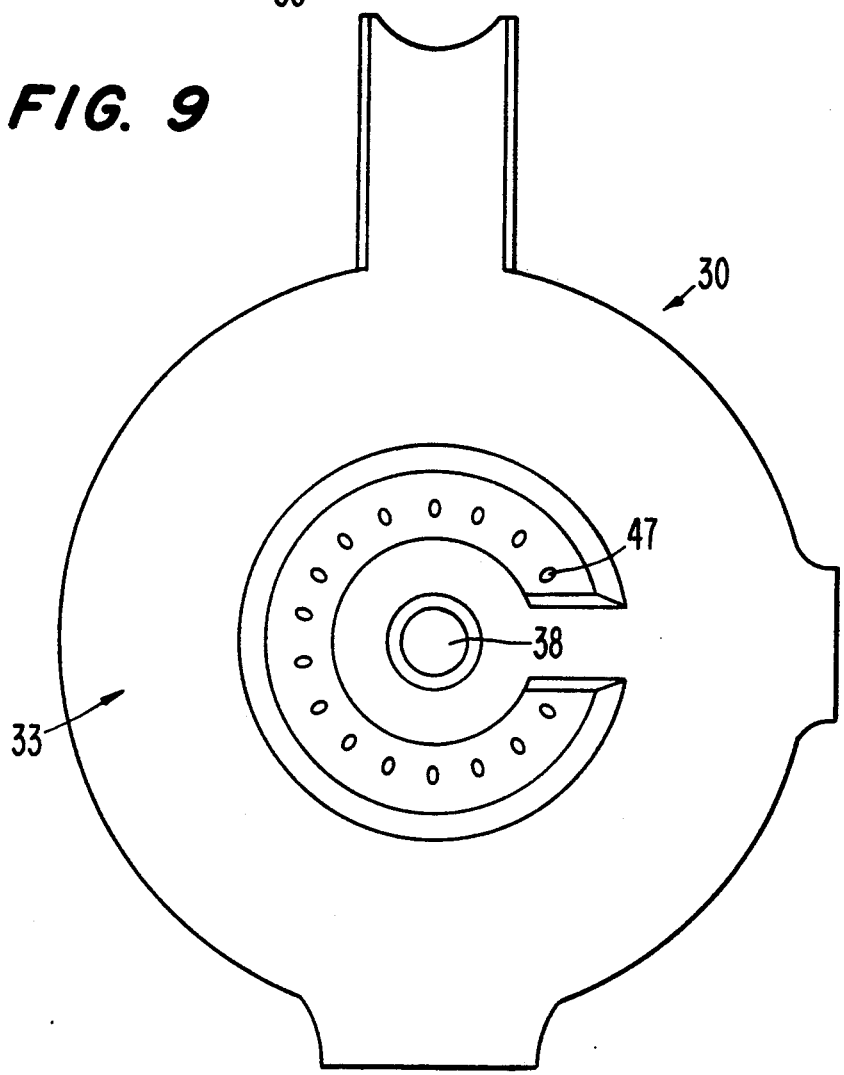
FIG. 9 is a plan view of the bottom of the evaporator plate shown in FIG. 6.

Oil moves through the conical bores or passageways 47 and flows in a thin film downwardly along vaporizing surfaces 41 and 44 toward the fluid flow path located between the radially disposed annular sectioned walls 42a and 42b as shown in FIG. 6. While the oil is in a thin film, the heat transmitted from center member 40 vaporizes the volatile contaminates such as water and fuel which have become entrapped in the lubricating oil during its use. Because of the thin film, water will evaporate at less than 212° F. and fuel will evaporate at less than flash point.

The filter side of evaporator plate 30 includes a planar surface 33 for receiving a sealing member or gasket 90 seated on shoulder 64 of face plate 51 and a lip 65 located along the entire periphery of filter plate 31 to provide a snug fit between the face plate 51 and planar surface 33.

The oil discharging area of the filter is located in the upper end central portion of face plate 51. The upper end portion of face plate 51 is formed with a domed configuration 66 and a threaded central female tapped hole 67 which receives evaporator plate projecting member 36 to hold the filter in place on the evaporator plate. Spaced radial openings 68 are equally spaced and located in the upper end of the domed portion enable all of the oil to be directed from the filter toward the passageways 47 and into the evaporation chamber 100.

The filter cartridge 52 contains eight ounces of fibrous filter material 62 such as long strand cotton fiber material of spun cotton yarn which is tightened around the tube 60 to form a 1-3 micron filter. The cotton material absorbs sulfur thereby neutralizing acids which paper cannot do. Oil enters oil inlet 32, passes down bore 38, and continues flowing down into flow tube 60. The oil exits center tube 60 through perforations 61 so that it is discharged laterally along the filter through fibrous material 62 thereby removing particles down to one micron diameter from the oil. The oil under pressure continues upward past the secondary pad felt filter 63 and through the holes 68 of the domed section 66 and then rises through the center member 40 via conical passageways 47. The oil flows down into the circular area (vaporizing surface) defined by central member 40 and wall sections 42a and 42b into the evaporation chamber 100.

Heater 80 heats evaporator plate 30 and causes the oil to vaporize out the liquid impurities as it travels around the respective walls and chamber areas previously enumerated.

Clips can be used to tighten the evaporator plate and filter housing together.

OPERATION OF THE APPARATUS

In operation the impure oil containing impurities such as carbon, dirt, silica, water, sulfuric acid ($H_2SO_4$), fuel and the like enters the oil reclamation device 20 by way of oil inlet 32 through bore 38 along the filter tube 60 and out circumferentially positioned holes 61 in the tube into the filtering media 62. Due to the pressure maintained by the oil pump of the internal combustion engine the oil works its way through the filtering media 62, out the side perforations of the cartridge side wall 53, through the secondary ⅛ inch felt pad filter 63, through the apertures 68 of the filter plate 51 up passageways 47 of the evaporator plate into the vaporization chamber 100. The solid impurities such as dirt, silica, dust and carbon particles are captured by the secondary filter pad 63 and filtering media 62. Since the oil and liquid contaminates have different densities, the two became separated as they engage the heated wall surfaces 41 and 44 and pass over the various baffles formed by walls 42. The liquid contaminates such as water, fuel and sulfuric acid vaporize and are carried off by vent 78 into the atmosphere. The evaporation surfaces in the evaporation chamber 100 work as baffles and change the direction of the vapor and liquid carrying air causing the oil vapor to fall down and condense into the sectioned areas of the chamber due to the force of gravity and finally exit via the oil outlet 34 to the crank case for reuse as a lubricant. This is a continuous process which removes the solid and liquid contaminates on each cycling of the oil. Thus the system allows a greater time and mileage interval between oil changes, improves gas milage and insures continuous removal of liquid as well as solid contaminants.

While the description of the invention and the operation has been addressed in terms of oil purification, the term oil could emphasize hydraulic fluid or any other lubrication or fluid which requires cleaning to maintain its original purpose and effectiveness.

While the oil reclamation device has been shown and described in detail, it is obvious that this invention is not to be considered as being limited to the exact form disclosed, and that changes in detail and construction may be made therein, within the scope of the invention, without departing from the spirit thereof.

What I claim is:

1. A fluid reclamation device for filtering solid and liquid impurities form fluid comprising;
   a removable filter assembly comprising a housing, a perforated plate means defining fluid outlet means secured to said housing, a fluid discharge tube mounted to said perorated plate means, and filter cartridge means mounted in said housing;
   said filter cartridge means comprising a cylindrical casing with a perforated side wall and solid end walls, one of said end walls being provided with a central aperture through which said fluid discharge tube extends;
   an evaporator plate including means holding for said filter assembly in removable spin on attachment thereto; said evaporator plate defining fluid inlet means, fluid outlet means, and a heater chamber;
   a heater means mounted in said evaporator plate heater chamber having a surface to surface engagement with the evaporator plate for heating the fluid circulating in an evaporation chamber formed by said evaporator plate and a cap member secured thereto causing vaporization of liquid impurities in the fluid; and
   vent means formed in said cap member for discharging the vaporized impurities and said fluid outlet means leading from said evaporation chamber for discharging filtered fluid.

2. A fluid reclamation device as claimed in claim 1, wherein said filter assembly includes a second filter comprising a pad formed of fiber with a 1-4 micron porosity, said pad being positioned, in the flow path between said cartridge filter material and perforated top plate.

3. A fluid reclamation device as claimed in claim 2 wherein said fiber is felt.

4. A fluid reclamation device as claimed in claim 1 wherein said filter cartridge means defines a spring seat which holds spring means allowing said filter cartridge means to be spring mounted in said housing.

5. A fluid reclamation device as claimed in claim 1 wherein said evaporator plate body has a substantially circular configuration with a bottom planar surface and defines a fluid inlet channel which provides fluid communication with a projection member extending outwardly form the bottom planar surface of the evaporator plate body, said projection member receiving and holding the removable filter assembly and discharging fluid form said fluid inlet channel into said fluid discharge tube.

6. An oil reclamation device for filtering solid and liquid impurities from oil comprising;
   a cap member, an evaporator plate removably mounted to said cap member forming a baffled evaporation chamber between the cap member and the evaporator plate for receiving oil from a filter assembly and circulating the oil in the evaporation chamber, said evaporator plate having a planar lower surface with a projecting member adapted to hold a filter assembly;
   said filter assembly comprising a housing with an open end, a perforated end plate defining an oil outlet means and a seal seat, said end plate being mounted over the open end of said housing, a perforated filter cartridge containing filter material removably mounted in said housing, said perforated filter cartridge including a central oil discharge tube extending to at least to both ends of said filter cartridge
   a heater means mounted in a heater chamber formed in a central heating member extending form the upper surface of said evaporator plate for surface to surface engagement with the evaporator plate central heating member, said central heating member being configured with outwardly inclined top and side surfaces, said heater being adapted to heat oil cascading down the top and side surfaces of the central heating member and heat oil circulating in the evaporator chamber causing vaporization of liquid impurities int eh oil, and vent means formed in said cap member to discharge said vaporized impurities.

7. A fluid reclamation device as claimed in claim 6 including threaded fastening means securing said cap member to said evaporator plate assembly.

8. An oil reclamation device as claimed in claim 6 wherein said heater means comprises a cylindrical heater member adapted to snugly fit in said heater chamber and a attachment flange secured to said heater member and extending from said heater member.

9. An oil reclamation device for filtering solid and liquid impurities from oil comprising;
   a cap member , an evaporator plate removably mounted to said cap member forming a baffled evaporation chamber between the cap member and the evaporator plate for receiving oil from a filter assembly and circulating the oil in the evaporation chamber for vaporization, said evaporator plate having a planar lower surface with a projecting member adapted to hold a filter assembly;
   said filter assembly comprising a housing body, a perforated end plate defining an oil outlet means mounted to said housing body and forming a chamber, a perforated cartridge assembly mounted in said housing, said perforated cartridge assembly comprising a cylindrical perforated side wall and two end walls secured to said side wall, at least one of said end walls engaging a central oil discharge tube and a filter pad mounted adjacent one of said end walls adjacent the perforated end plate, a heater mounted in a heater chamber formed in a central heating member of said evaporator plate for surface to surface engagement with said evaporator plate central heating member, said heater being adapted to heat oil cascading down an downwardly inclined surface of the central heating member to heat oil circulating in the evaporator chamber causing evaporation of liquid impurities in the oil; and vent means formed in said cap member to discharge evaporated impurities.

10. An oil reclamation device as claimed in claim 9 wherein said second filter is a pad formed of fiber with a 1–4 micron porosity.

11. An oil reclamation device as claimed in claim 10 wherein said fiber is felt.

12. An oil reclamation device as claimed in claim 9 wherein said fluid discharge tube defines a central bore and a plurality of radial throughgoing bores extending through the tube from the central bore to the exterior of the tube along substantially its entire length.

13. An oil reclamation device as claimed in claim 9 wherein said filter cartridge means is a cylindrical casing with a perforated side wall and solid end walls, one of said end walls being provided with a central apertures through which said discharge tube extends, the other end wall defining a spring seat allowing said cartridge means to be spring mounted is aid housing.

14. An oil reclamation device as claimed in claim 9 wherein said perforated end plate includes a central domed area with a planar top defining a central aperture to receive said evaporation plate projecting member and an annular rim surrounding said central doomed area for retaining and holding sealing means.

15. A fluid reclamation device for filtering solid and liquid impurities from fluid comprising;

a removable filter assembly comprising a housing having a cylindrical body configuration, a perforated top plate secured to said housing, said perforated top plate having an upper surface relative to said filter assembly, said perforated top plate defining secondary fluid outlet means and further defining an annular shoulder for holding a sealing gasket on said upper surface, and filter cartridge means mounted in said housing;

a fluid discharge tube centrally mounted to said perforated top plate and defining a central bore and a plurality of radial throughgoing bores extending through said tube from said central bore to the exterior of the tube along substantially its entire length;

said filter cartridge means comprising a cylindrical casing with a perforated side all and solid end walls, said cylindrical casing containing a filtration medium spun around said fluid discharge tube, one of said end walls being provided with a central aperture through which said fluid discharge tube extends;

an evaporator plate defining fluid inlet means, fluid outlet means, and a heater chamber, said evaporator plate including holding means for removable spin on attachment of said filter assembly such that said sealing gasket provides a leakproof seal between said filter housing and said evaporator plate;

a heater means mounted in said heater chamber having a surface to surface engagement with said evaporator plate for heating the fluid circulating in an evaporator chamber formed by said evaporator plate and a cap member secured thereto causing vaporization of liquid impurities in the fluid; and vent means formed in said cap member for discharging the vaporized impurities and said fluid outlet means leading from said evaporation chamber for discharging filtered fluid.

* * * * *